United States Patent [19]
Hahn

[11] 3,796,366
[45] Mar. 12, 1974

[54] ANTI-STATIC PLASTIC ARTICLES

[75] Inventor: Granville James Hahn, Big Spring, Tex.

[73] Assignee: Cosden Oil & Chemical Company, Big Spring, Tex.

[22] Filed: July 26, 1971

[21] Appl. No.: 166,270

[52] U.S. Cl. 229/1.5 B, 117/138.8 A, 117/138.8 D, 117/138.8 E, 117/138.8 UF, 117/138.8 UA, 117/94, 117/139.5 A, 117/161 UF, 229/3.5 R
[51] Int. Cl. ............... B32b 27/00, C08d 13/24
[58] Field of Search ............ 117/139.5 A, 139.5 CQ, 117/138.8, 161 UF, 94; 96/114.1; 229/1.5, 3.5

[56] References Cited
UNITED STATES PATENTS

| | | | |
|---|---|---|---|
| 3,374,922 | 3/1968 | Shelby | 220/83 |
| 3,189,242 | 6/1965 | Orr | 117/138.8 UA |
| 3,226,352 | 12/1965 | Helin et al. | 260/29.6 A X |
| 3,245,831 | 4/1966 | Shippee | 117/139.5 A |
| 2,653,919 | 9/1953 | Hunter | 117/161 UF |
| 3,455,642 | 7/1969 | Solomon | 117/139.5 A |
| 2,876,127 | 3/1959 | Ware | 117/139.5 CQ |
| 3,206,429 | 9/1965 | Broyles et al. | 117/161 UF |
| 2,778,748 | 1/1957 | Rowe | 117/139.5 CQ |
| 3,595,464 | 7/1971 | Harrison | 117/138.8 B X |
| 3,211,808 | 10/1965 | Young et al. | 117/21 X |

FOREIGN PATENTS OR APPLICATIONS

| | | | |
|---|---|---|---|
| 1,122,666 | 1/1962 | Germany | 117/139.5 |

*Primary Examiner*—William D. Martin
*Assistant Examiner*—Shrive P. Beck

[57] ABSTRACT

A method of rendering plastic articles resistant to the accumulation of static electricity, and articles produced thereby, are disclosed. The process comprises contacting a molded plastic article with an aqueous non-ionic emulsion of polyethylene, followed by removal of the water by evaporation. Treated articles are thus characterized as bearing on their surface the evaporation residue of such emulsions. The invention is particularly useful for treating nestable cups of foamed thermoplastic material, advantageously of foamed polymers of styrene.

9 Claims, No Drawings

ANTI-STATIC PLASTIC ARTICLES

BACKGROUND OF THE INVENTION

This invention relates to the treatment of plastic articles to render the same resistant to the accumulation of static electricity, and more especially to the treatment of nestable cups of thermoplastic material, advantageously foamed polymers of styrene, to eliminate certain static electricity problems encountered in the handling of such cups.

Articles manufactured from foamed and non-foamed natural and/or synthetic resinous materials are typically characterized by a severe propensity to accumulate charges of static electricity on their surfaces. As a result, there often arise serious problems in connection with the handling of such articles, especially if the attractive forces resulting from the accumulated static charges are large in comparison to the mass of the article itself, a particularly severe problem in the case of foamed articles. One area where this problem is particularly acute resides in the manufacturing, packaging, and ultimate dispensing, as for example from vending machines, of lightweight cups manufactured from thermoplastic synthetic resins. Foamed cups of this type have become increasingly popular for the vending of hot beverages; however, their use has been severely restricted because of the difficulties attendant the dispensing of foamed cups from conventional vending equipment. See for example, U.S. Pat. No. 3,374,922. Thus, while a significant static electricity problem exists as regards both foamed and non-foamed cups, i.e., they tend to stick together when nested with like cups and thereby fail to properly drop into position for filling with beverage, the problem is more acute with the foamed variety.

Moreover, recent developments in the vending of certain hot beverages, most notably coffee, provide for the packaging of a solid beverage concentrate in the bottom of the unfilled nested cups. In such a vending configuration, the accumulation of static electricity on the cups themselves is especially problematic and must be carefully avoided since the static charges on the bottom of one cup tend to attract the usually finely granulated or powdered beverage concentrate contained in the cup immediately below it. Obviously, adherence of any significant portion of the beverage concentrate to the bottom surface of the immediately-above cup would result in a gross waste of expensive ingredient as well as a deficiency in the formulation of the ultimately vended beverage.

SUMMARY OF THE INVENTION

It is therefore an object of this invention to provide a method for simply and economically treating articles of plastic material to render the same resistant to the accumulation of static electricity.

It is another object of this invention to provide a means of treating lightweight plastic cups to render them antistatic and thus, less likely to stick together when nested with like cups.

Another object of the invention is to provide a method for treating plastic cups to eliminate static charges which cause wasteful adherence of beverage concentrate particles packaged in an adjacent nested cup.

Yet another object of the invention resides in the provision of an anti-static treatment for plastic articles which renders the articles resistant to loss of anti-static protection due to abrasion.

It is a specific object of the invention to provide a method for treating foamed beverage cups to render the same resistant to the accumulation of static electricity.

Other objects, features and advantages of this invention will become obvious from the description of the invention which follows:

In accomplishing the foregoing objects, there has been provided according to the invention a method for rendering a plastic article resistant to the accumulation of static electricity, which comprises contacting said article with an aqueous non-ionic emulsion of polyethylene, and thence subjecting the article to drying conditions to remove substantially all of the water therefrom. The resultant treated article may thereby be characterized as bearing on its surface the evaporation residue of the aqueous non-ionic emulsion of polyethylene. Preferably, the aqueous non-ionic emulsion of polyethylene is a mechanically stable emulsion of substantially oxygen-free polyethylene particles having an average particle size of from about 0.02 to 0.5 micron and an average molecular weight of from about 7,000 to about 40,000. The polyethylene particles themselves have at least 30 percent of their surface area covered with a non-ionic emulsifier composition, the most preferred example of which comprises compounds of the formula:

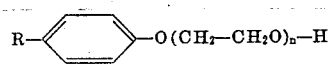

wherein R is an alkyl group having 8 to 9 carbon atoms and wherein $n$ is an average number of from 7 to 15.

A most preferred application of the foregoing method resides in the treatment of cups and like containers manufactured from synthetic resin, advantageously foamed synthetic resin, to render the same anti-static and therefore less likely to stick together when nested with other like containers, and moreover, to eliminate the problem of adherance of beverage concentrate particles packaged in one such nested cup to the bottom outside surface of an adjacently nested cup. Advantageously, the cups or other containers are manufactured from a foamed polymer, such as for example, foamed homopolystyrene or impact polystyrene.

DETAILED DESCRIPTION OF THE INVENTION

The process of this invention for rendering a plastic article resistant to the accumulation of static electricity is broadly applicable to articles formed out of any material capable of being thermo-formed into a molded or shaped article, including both natural resins as well as synthetic resins of the thermoplastic or thermosetting varieties. The present invention finds particular use in the rapidly growing area of expanded synthetic resin materials and their wide application in the area of flotation, sound and heat insulation, and packaging for such divergent commodities as eggs, light bulbs, prepackaged meat, and small appliances. The most notable example in the area of thermosetting synthetic resins is that of the polyurethanes, while typical thermoplastic synthetic resins include polymers based on styrene, vinyl halides, vinylidene halides, vinyl acetate, cellulose acetate or butyrate, ethyl cellulose, acrylic acid esters, methacrylic acid esters, acrylonitrile, ethylene, propylene and higher olefins, isobutylene, fluoro olefins and chloro olefins, as well as copolymers, interpolymers, graft copolymers, block copolymers, and chlorinated and chlorosulfonated polymers of the monomers corresponding to the above-mentioned polymeric products, and mixtures of the above. In one area of particular importance, namely, that of cups for both hot and cold beverages, a preference has clearly developed for manufacturing these articles out of foamed polymers based on styrene, especially homopolystyrene and/or rubber modified polystyrene, i.e., impact polystyrene. Thus, while the preferred application of the present invention resides in its use in connection with articles manufactured from foamed synthetic resins and especially those based on styrene polymers, it is to be understood that the invention is broadly useful as applied to articles, both foamed and non-foamed, made from plastic material, and therefore, the term "plastic" shall be deemed to include all of those materials set forth above. Likewise, the invention is intended to encompass molded articles coated with any of the above plastic materials, e.g., plastic coated paper cups.

The aqueous non-ionic emulsions of polyethylene used in the present invention are well known in the art, and these emulsions per se do not form any part of the invention. Suitable emulsions of this type may contain anywhere from about 5 to about 50 percent solids content by weight. The polyethylene solids contained in these lattices are substantially oxygen-free (less than about 1 percent), substantially sulfur-free (less than about 0.1 percent) materials having melting points from about 80° to about 115°C., and average molecular weights of from about 7,000 to about 30,000 or 40,000. Depending on the specific conditions under which they are prepared, the polymers may have inherent viscosities between about 0.25 and about 1.4. The density of these polyethylene solids is generally between about 0.91 and 0.94 grams per cubic centimeter.

Thus, the polyethylene solids are to be carefully distinguished from certain prior art oxygenated polyethylenes which are produced by telomerization of ethylene and subsequent oxidation of the telomer, or by thermal degradation of high molecular weight polyethylenes to low molecular weight products which are then oxidized. These prior art oxygenated materials rarely exhibit a molecular weight of more than about 3,000, and moreover, are characterized by a yellowish color and disagreeable odor which render them unsuitable for the uses presently contemplated, especially in connection with molded articles utilized in the area of food packaging such as beverage cups made of foamed polystyrene which, moreover, are typically pure white in color.

The latex particles of the presently contemplated polyethylene emulsions range in average size between about 0.02 micron and about 0.5 micron. These particles generally have at least about 30 percent of their total available surface area covered with a non-ionic emulsifying agent and more typically have between about 30 and 80 percent coverage thereof. However, suitable emulsions for the purposes of the present invention may contain polyethylene particles post-stabilized with additional emulsifier to saturate the particles such that they have substantially 100 percent of their total available surface area covered with one or more emulsifying agents. See U.S. Pat. No. 3,296,162. Non-ionic polyethylene emulsions presently preferred in the invention are those wherein the non-ionic emulsifying agent is an alkyl phenoxy polyoxyethylene ethanol emulsifier of the formula:

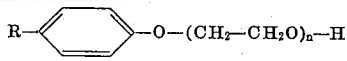

wherein R is an alkyl chain having 8 or 9 carbons, advisably branched such as a polypropylene or polybutylene chain and $n$ represents an average number of 7 to about 15. Typical commercially available emulsifiers of this type include "Triton" series such as "Triton X-100" ($R=C_8$; $n=9-10$); "Triton X-114" ($R=C_8$; $n=7-8$); "Triton N-101" ($R=C_9$; $n=9-10$); "Triton N-128" ($R=C_9$; $n=12-13$); "Tergitol NPX" ($R=C_9$; $n=10$); and "Igepal CO-730" ($R=C_9$; $n=13.5$), etc.

Aqueous non-ionic emulsions of polyethylene suitable for use in the present invention may be obtained by polymerizing ethylene in an aqueous medium at a temperature of from about 60° to 150°C., preferably at a temperature of from 70° to 100°C., and at pressures between about 2,000 to 20,000 psi, preferably between about 2,500 to 4,500 psi. The aqueous medium may contain an alcohol such as t-butanol in amounts up to about 35 percent by weight of the medium. An initiator, such as an alkali metal persulfate, e.g., potassium persulfate, may be employed, generally in amounts of from about 0.08 percent to about 0.5 percent based on the weight of the aqueous medium. Polymerization proceeds in the presence of from about 1 to 5 percent of a non-ionic emulsifier, also based on the weight of the aqueous medium. Emulsions produced directly in the polymerization process typically have a minimum of about 14 percent solids by weight for practical reasons and may contain up to 30 percent or even 40 percent solids while still retaining their stability. Under certain conditions, these emulsions may be post-stabilized to concentrations of up to about 50 percent solids by weight. Emulsions of this type are characterized by reactor stability, strip stability, shelf stability, chemical stability and, with few exceptions, mechanical stability. A description of several preferred polyethylene emulsions and several methods of producing such emulsions are contained in U.S. Pat. Nos. 3,226,352, No. 3,296,162 and 3,536,643. In addition, an aqueous non-ionic polyethylene emulsion most preferred in the present invention is available under the trademark "Poly-Em 40" from Cosden Oil and Chemical Company, Big Spring, Texas.

It is also noted that the plastic articles to be treated in accordance with the present invention do not in and of themselves form any part of the invention. Molded articles manufactured from the hereinabove delineated materials are well known in the art as are the many methods conventionally employed to produce the basic plastic materials. Thus, the invention is deemed to be broadly applicable to mold plastic articles manufactured according to any of the well known methods and to articles of foamed plastic material regardless of how said material has been foamed, e.g., extrusion process, expandable beads, etc., and regardless of the ultimate process employed to form the shaped article, e.g., molding beads, extrusion, foaming in situ, etc. The principles and practice of these processes are well known to those of ordinary skill in the art, and in particular, with reference to the manufacture of cups from foamed polymers of styrene, attention is directed to U.S. Pat. Nos. 3,013,306 and No. 3,374,922.

The manner of treating the foamed articles with non-ionic polyethylene emulsions according to this invention is not of a critical nature. Thus, the shaped articles may be contacted with the emulsions in any known manner, as for example, by dipping, brushing, rolling, spraying, etc. Neither is the solids concentration of the particular polyethylene emulsions of importance in achieving the desired results according to this invention. Thus, the topic emulsions may contain from about 2 to about 40 or even 50 percent by weight polyethylene solids, although they more preferably contain from about 7 to about 20 percent. Most conveniently, emulsions suitable for application in accordance with the invention may be prepared by diluting commercially available polyethylene emulsion compositions with water, as for example, a typical emulsion containing approximately 40 percent polyethylene solids may be diluted with from about 1 to 6 parts of water per part emulsion.

In treating a molded plastic article with a non-ionic polyethylene emulsion in accordance with the invention, it is not necessary that the entire surface of the article be completely wetted or contacted with the emulsion. Significant enhancement of the anti-static properties of the article is obtained when even a minor percentage of the total surface area is contacted with the polyethylene emulsions. An advantageous means of applying the emulsion resides in the use of an aspirator or other device which provides a fine spray so that the entire article may be sprayed with an emulsion over substantially its entire surface, although not necessarily producing a continuous coating of the emulsion upon the surface of the article. In this manner, an optimum percentage of surface area is contacted while at the same time, a minimum amount of emulsion need be expended. Such a contacting method also provides the salient advantage of employing a minimum amount of water so as to facilitate removal thereof as the final step of the treatment. In this regard, it will be appreciated that evaporation of the water may be achieved by subjecting the treated article to any suitable drying conditions, limited only by the temperature conditions which the particular plastic material forming the article is able to withstand. Thus, drying may take place for a short period of time at a high temperature, or alternatively over a longer period of time at a lower temperature. The drying temperature and times are merely mechanical operating parameters, and therefore will be readily ascertainable for a given plastic material by those of ordinary skill in the art. It will of course be appreciated that treatment may be limited to only a specific portion of a particular foamed article if desired. Thus, for example, where it is intended only to prevent adherence of solid beverage concentrate to the outer bottom surfaces of adjacently nested cups, only the base portion of each cup need be contacted with the topic emulsion.

Treatment of molded plastic containers in accordance with the invention has been found to be entirely compatible with conventional container manufacturing processes. For example, in the manufacture of foamed polystyrene cups, the same are typically subjected to a printing step after which they are conveyed through a drying chamber and thence to a stacking machine. In such a context, a non-ionic polyethylene emulsion may be sprayed onto the foamed cup subsequent to the printing step but preliminary to the drying step so that advantage may be taken of this latter step to additionally remove from the cup water resulting from the added spray treatment.

A further advantage of the present anti-static treatment resides in the degree of permanency attained thereby. Thus, it has been observed that treated plastic articles remain substantially devoid of static charges even after being subjected to extensive handling involving high exposure to abrasion.

The following specific embodiments are presented to more fully illustrate the invention, it being understood that the same are merely intended to be illustrative and in no wise limitative.

EXAMPLE 1

A pH stable non-ionic polyethylene emulsion available under the trademark Poly-Em 40 (Cosden Oil & Chemical Co.) and having the following properties:
Total solids — 40.6%
Total emulsifier (non-ionic) — 5.21%
pH 7.7
Polymer density — 0.92 grams per cc.
Brookfield viscosity — 50 cps.
Particle size — less than 0.1 micron
Apparent average polymer molecular weight — 18,000
Polymer melting point (modified ring and ball method) — 109°C. is diluted with five parts of water per part of polyethylene emulsion. The resulting emulsion is placed in an aspirator and sprayed upon foamed polystyrene cups as they leave a cup printer. The cups are sprayed such that substantially the entire outer surface area thereof is at least contacted with a portion of the emulsion spray. After spraying, the cups are passed through a standard post-printing drying step, from which they emerge in a dry condition, and are further conveyed to a conventional stacking machine.

Cups treated in the above manner are compared with identical untreated cups by taking a sample cup from each group and rubbing it five times along the surface of a woolen fabric and thereafter placing each cup in a nested configuration with a like cup containing therein finely granulated instant coffee. It is noted that the coffee has a definite tendency to adhere to the bottom of the untreated cup, whereas no coffee whatsoever adheres to the treated cup. It is also noted that the treated cups separate from a nested configuration much more easily than those cups which were not treated with the polyethylene emulsions. Further testing of the treated cups indicates that the same, after being rubbed five times on a wool fabric, totally resist even the adherence of cigarette ashes when placed immediately over a container of this material. The test cups are again subjected to vigorous rubbing with a woolen fabric, whereupon it is noted that the foregoing static-free properties still remain. This indicates that the anti-static properties attained through treatment with a non-ionic polyethylene emulsion are not lost even after considerable abrasion.

EXAMPLE 2

The procedure of Example 1 is repeated utilizing a lightweight thin-walled cup made of polyethylene instead of the foamed polystyrene cup. While the propensity of these cups to "jam" or fail to unstack is less than with foamed cups, there still exists a formidable problem as evidenced by the failure of untreated cups to readily separate by gravity alone after the same have been subjected to rubbing with a woolen fabric. In comparison, the treated cups readily separate despite vigorous rubbing.

While there have been described and pointed out the fundamental novel features of the invention as applied to the preferred embodiment, those skilled in the art will appreciate that various modifications, changes, and omissions in the process for rendering plastic articles anti-static described herein can be made without departing from the spirit of the invention. It is intended, therefore, to be limited only by the scope of the following claims.

What is claimed is:

1. A molded foamed plastic article being highly resistant to the accumulation of static electricity, comprising said article bearing on its surface the evaporation residue of an aqueous non-ionic emulsion of polyethylene comprising particles having an average particle size of from 0.02 to 0.5 micron and an average molecular weight of from about 7,000 to about 40,000 of a substantially oxygen-free, substantially sulfur-free polymer consisting essentially of polymerized ethylene monomer, said polyethylene particles having at least 30 percent of their surface area covered with a non-ionic compound of the formula:

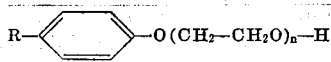

wherein R is an alkyl group having 8 to 9 carbon atoms and $n$ is an average number of from 7 to 15.

2. A plastic article as defined by claim 1, wherein said article is made from a foamed polymer of styrene.

3. A foamed plastic article as defined by claim 2, wherein said polymer of styrene is homopolystyrene.

4. A foamed plastic article as defined by claim 2, wherein said polymer of styrene is impact polystyrene.

5. A plastic article as defined by claim 1, wherein said article is a nestable container.

6. A plastic article as defined by claim 5, wherein said nestable container is a cup.

7. A plastic article as defined by claim 6, wherein said cup is made of a foamed polymer of styrene.

8. A plastic article as defined by claim 7, wherein said polymer of styrene is homopolystyrene.

9. A plastic article as defined by claim 7, wherein said polymer of styrene is impact polystyrene.

* * * * *